(12) United States Patent
Kroening, Jr.

(10) Patent No.: US 9,387,902 B2
(45) Date of Patent: Jul. 12, 2016

(54) ASSEMBLY FOR INCREASING MOTORCYCLE WHEEL COUNT

(71) Applicant: Superior Design, Inc., Waukesha, WI (US)

(72) Inventor: John W. Kroening, Jr., New Berlin, WI (US)

(73) Assignee: Scorpion Trikes, Inc., Waukesha, WI (US)

( * ) Notice: Subject to any disclaimer, the term of this patent is extended or adjusted under 35 U.S.C. 154(b) by 154 days.

(21) Appl. No.: 14/157,083

(22) Filed: Jan. 16, 2014

(65) Prior Publication Data

US 2015/0197304 A1 Jul. 16, 2015

(51) Int. Cl.
| | |
|---|---|
| *B62D 61/06* | (2006.01) |
| *B62K 13/04* | (2006.01) |
| *B62K 5/027* | (2013.01) |
| *B62K 5/05* | (2013.01) |
| *B62K 5/08* | (2006.01) |

(52) U.S. Cl.
CPC .................. *B62K 13/04* (2013.01); *B62K 5/027* (2013.01); *B62K 5/05* (2013.01); *B62K 5/08* (2013.01); *Y10T 29/49716* (2015.01)

(58) Field of Classification Search
CPC .......... B62K 13/04; B62K 13/00; B62K 5/05; B62D 61/065; B60G 2300/122
USPC ................................................. 180/209, 210
See application file for complete search history.

(56) References Cited

U.S. PATENT DOCUMENTS

| | | | |
|---|---|---|---|
| 4,020,914 A | 5/1977 | Trautwein | |
| 4,088,199 A * | 5/1978 | Trautwein | B60G 21/007 180/209 |
| 4,697,663 A | 10/1987 | Trautwein | |
| 5,236,060 A | 8/1993 | Huber | |
| 6,817,617 B2 * | 11/2004 | Hayashi | B62K 5/05 280/124.1 |
| 6,964,314 B1 | 11/2005 | Vey | |
| 7,073,806 B2 | 7/2006 | Bagnoli | |
| 7,487,985 B1 * | 2/2009 | Mighell | B62K 5/027 180/210 |
| 7,530,419 B2 | 5/2009 | Brudeli | |
| 7,591,337 B2 | 9/2009 | Suhre et al. | |
| 7,926,607 B2 | 4/2011 | Seiter | |
| 7,967,606 B2 | 6/2011 | Sager | |
| 2004/0035625 A1 | 2/2004 | Talbot et al. | |
| 2007/0251745 A1 * | 11/2007 | Codere | B62K 5/027 180/210 |
| 2007/0278763 A1 * | 12/2007 | Saville | B62K 5/05 280/269 |
| 2011/0275256 A1 * | 11/2011 | Gibbs | B60F 3/0007 440/12.51 |
| 2014/0035255 A1 * | 2/2014 | Erickson | B62K 21/02 280/279 |

* cited by examiner

*Primary Examiner* — James English
(74) *Attorney, Agent, or Firm* — Boyle Fredrickson, S.C.

(57) ABSTRACT

An assembly for converting a motorcycle from a two wheel vehicle into a three wheel vehicle having alternate left and right side front wheels. The assembly is constructed to cooperate with an underlying motorcycle frame without physically altering the underlying motorcycle frame. The assembly includes a center frame assembly that is securable to the underlying motorcycle frame and which aligns a support tube of the assembly with a passage defined by a head tube of the motorcycle frame. Respective A-arm assemblies are pivotably secured to alternate lateral sides of the center frame assembly and a steering arm is pivotably attached to each A-arm assembly. A tie rod extends inboard from each steering arm to an area bounded by the center frame assembly and operatively cooperates with a steering shaft that passes through the head tube and the support tube to effectuate turning of the left and right side front wheels.

20 Claims, 12 Drawing Sheets

ASSEMBLY FOR INCREASING MOTORCYCLE WHEEL COUNT

FIELD OF THE INVENTION

The present invention relates generally to a method and kits for converting a motorcycle from a two-wheeled vehicle into a vehicle with two front wheels wherein the conversion can be effectuated with customary hand and power tools and without physically modifying the discrete physical parts of the frame of the underlying motorcycle.

BACKGROUND OF THE INVENTION

Motorcycles are conventionally thought of as two wheeled vehicles which are commonly configured to support an operator and an optional passenger. The cabin-less construction of motorcycles, as compared to other four wheeled road vehicles, renders them popular for recreational as well as utilitarian uses. The fuel efficiency associated with operation of many motorcycles renders them desirable as an economic means of transportation. Motorcycles, are commonly configured with a single front wheel and; a single rear wheel and are oriented to support the operator and optional passenger in an aligned orientation relative to the direction of travel of motorcycle. Operation and steering control of many such vehicles is accommodated by operator interaction with a handlebar assembly that is rotational to manipulate an orientation of a front wheel relative to a longitudinal axis of the vehicle. Leaning of the operator, optional passenger, and the underlying vehicle relative to a vertical plane are common during turning activities.

The unique control configuration and operational requirements associated with use of motorcycles requires a skill set different than that associated with operation of conventional four-wheel vehicles. Many jurisdictions require separate licensing or certification associated with authorized operation of such vehicles on public roadways. Although many riders appreciate the open-air experience of motorcycle operation, some users and passengers do not appreciate the two wheeled configuration of such vehicles and the stability concerns associated therewith. That is, some users prefer the enhanced stability provided by motorcycles having more than two wheels.

In an effort to increase ridership, and thereby the consumer base associated with their products, some motorcycle manufacturers provide motorcycles having three-wheeled configurations. Such configurations can include vehicles having a single forward wheel and two rear wheels—sometimes referred to as "trikes", a single rear wheel and two forward wheels—sometimes referred to as Y-frames, or wheeled accessories, such as sidecars or the like, to accommodate potential consumers with such preferences. Unfortunately, such configurations are not without their respective drawbacks. Such deviations from the conventional two wheeled configurations can substantially increase manufacturing costs associated with designing, developing, manufacturing, and servicing the more diverse product platform associated with offering two wheeled and three wheeled motorcycle configurations. Such accommodations also limit the ability of owners of two wheeled motorcycle configurations to change the configuration of their vehicle aside from exchanging one entire vehicle for another.

Still others in an effort to individualize or alter the configuration of their respective vehicles, go to the somewhat extraordinary lengths of fully disassembling previously commercially available vehicles, manipulating the frame assembly associated therewith, and reassembling the same. Such an endeavor requires considerable knowledge as to the underlying workings of such vehicles including engine, transmission, bearing, electronic and fluid control systems, brake systems, etc. Such an endeavor also requires considerable knowledge and expertise with respect to metalworking processes, such as cutting and welding, to achieve a desired frame configuration capable of suitable cooperation of the underlying discrete components and systems. Unfortunately, such expertise and the tools associated with effectuating such changes or customizations are beyond the capabilities or availability of many owners of conventional two wheeled motorcycles. Still further, such alteration or customization of a commercially available two wheeled motorcycle requires, if even possible, similar expertise to return a customized vehicle to an original commercial configuration.

Accordingly, there is a need for a method and kits for converting commercially available two wheeled motorcycles into three wheeled motorcycle vehicles without manipulation or alteration of the discrete metal members of the underlying frame of the commercially available vehicle such that the wheel count of the vehicle can be changed between two and three wheeled configurations with the utilization of customary hand and power tools and a lower threshold associated with the expertise necessary to effectuate such a modification or customization. It is further desired to provide a method or kit that utilizes as much of the assembly of the underlying commercially available motorcycle to effectuate the customization in an economically feasible manner.

BRIEF DESCRIPTION OF THE INVENTION

The present invention discloses a method, kit, and assembly for converting commercially available two wheel motorcycles from a two wheel motorcycle vehicle configuration to a three wheel motorcycle vehicle configuration that overcomes one or more of the drawbacks discussed above. According to one aspect of the invention, the assembly is constructed to cooperate with an underlying motorcycle frame without physically altering the underlying motorcycle frame. The assembly includes a center frame assembly that is securable to the underlying motorcycle frame and which aligns a support tube of the assembly with a passage defined by a head tube of the motorcycle frame. Respective A-arm assemblies are pivotably secured to alternate lateral sides of the center frame assembly and a steering arm is pivotably attached to each A-arm assembly. A tie rod extends inboard from each steering arm to an area bounded by the center frame assembly and operatively cooperates with a steering shaft that passes through the head tube and the support tube to effectuate turning of the left and right side front wheels. Such a system preferably includes a supplemental wheel and brake assembly that coordinates with the original wheel, and brake assembly such that a commercially available two wheel motorcycle can be converted to a three wheel motorcycle configuration, and preferably back again, with the use of customary hand and power tools.

Another aspect of the invention discloses a kit for converting a motorcycle into a three-wheeled vehicle and includes one or more features that are combinable with one or more of the features or aspects disclosed above. The kit includes a first A-arm assembly and a second A-arm assembly. A steering arm is pivotably connected to one of the first and second A-arm assemblies, respectively, and an axle extends in an outward lateral direction from each steering arm. Each axle is constructed to rotationally support a wheel. Each of the first and second A-arm assemblies are pivotably connected to a center-frame assembly such that the first and second A-arm assemblies are oriented on opposite lateral sides of the center-frame. The kit includes a pair of tie rods that each has a first end that is connected to a respective steering arm and a second end that is positioned within a cavity bounded by the center-frame assembly. A support tube defined by a generally elongate body includes a first end that is secured to the center-frame assembly and a second end that oriented to engage a neck of a motorcycle frame. The support tube includes a passage that is formed therethrough and shaped to receive a steering shaft. A first end of the steering shaft is pivotably connectable to each tie rod and a second end of the steering shaft is oriented to extend through the neck of the motorcycle frame when the support tube is aligned with the neck of the motorcycle frame.

A further aspect of the invention discloses a three-wheeled vehicle that includes one or more features that are combinable with one or more of the aspects or features disclosed above. The three-wheeled vehicle includes a frame that is constructed to support a seat generally above an engine. A transmission is connected to the engine such that a single rear wheel can be driven by operation of the engine. A head tube is defined by the frame and is constructed to support a handlebar that is configured to turn a single front wheel. A space frame is removably attachable to the frame when the single front wheel is removed therefrom. A right side suspension frame and a left side suspension frame are each pivotably attached to the space frame and extend in opposite lateral directions relative to a longitudinal axis of the frame. A right side wheel mount is attached to the space frame by the right side suspension frame and a left side wheel mount is attached to the space frame by the left side suspension frame. A first tie rod is connected to the right side wheel mount and a second tie rod is connected to the left side wheel mount. A yoke is connected to each of the first tie rod and the second tie rod. A rigid stem tube has a first end that is secured to the space frame and a second end that is oriented rearward and above the first end to engage the head tube when the space frame is connected to the frame. A steer tube extends between the handlebar and the yoke and extends through the head tube and the stem tube such that manipulation of the handlebar effectuates concurrent turning of the right side wheel mount and the left side wheel mount.

Another aspect of the invention that includes one or more aspects or features that are combinable with one or more of the aspects or features disclosed above discloses a method of converting a motorcycle from a two-wheeled vehicle into a three-wheeled vehicle. The method includes removing a front fork and wheel assembly from engagement with a head tube of a commercially produced motorcycle. A space frame is attached to a forward facing portion of a frame of the commercially produced motorcycle without physically modifying the underlying frame of the commercially produced motorcycle. A right wheel mount and a left wheel mount are attached to the space frame and a tie rod is attached to each of the right wheel mount and the left wheel mount. A rigid steer tube is extended through the head tube of the frame of the commercially produced motorcycle and a stem tube connected to the space frame. A handlebar is connected to an upper end of the rigid steer tube. A lower end of the rigid steer tube is connected to each respective tie rod via a yoke such that twisting of the handlebar causes rotation of the rigid steer tube relative to the head tube and the stern tube and at least partly lateral translation of the tie rods relative to the space frame to effectuate concurrent rotation of each of the right and left wheel mounts relative to the space frame.

These and various other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate preferred embodiments presently contemplated of carrying out the invention. In the drawings.

Figure 1:
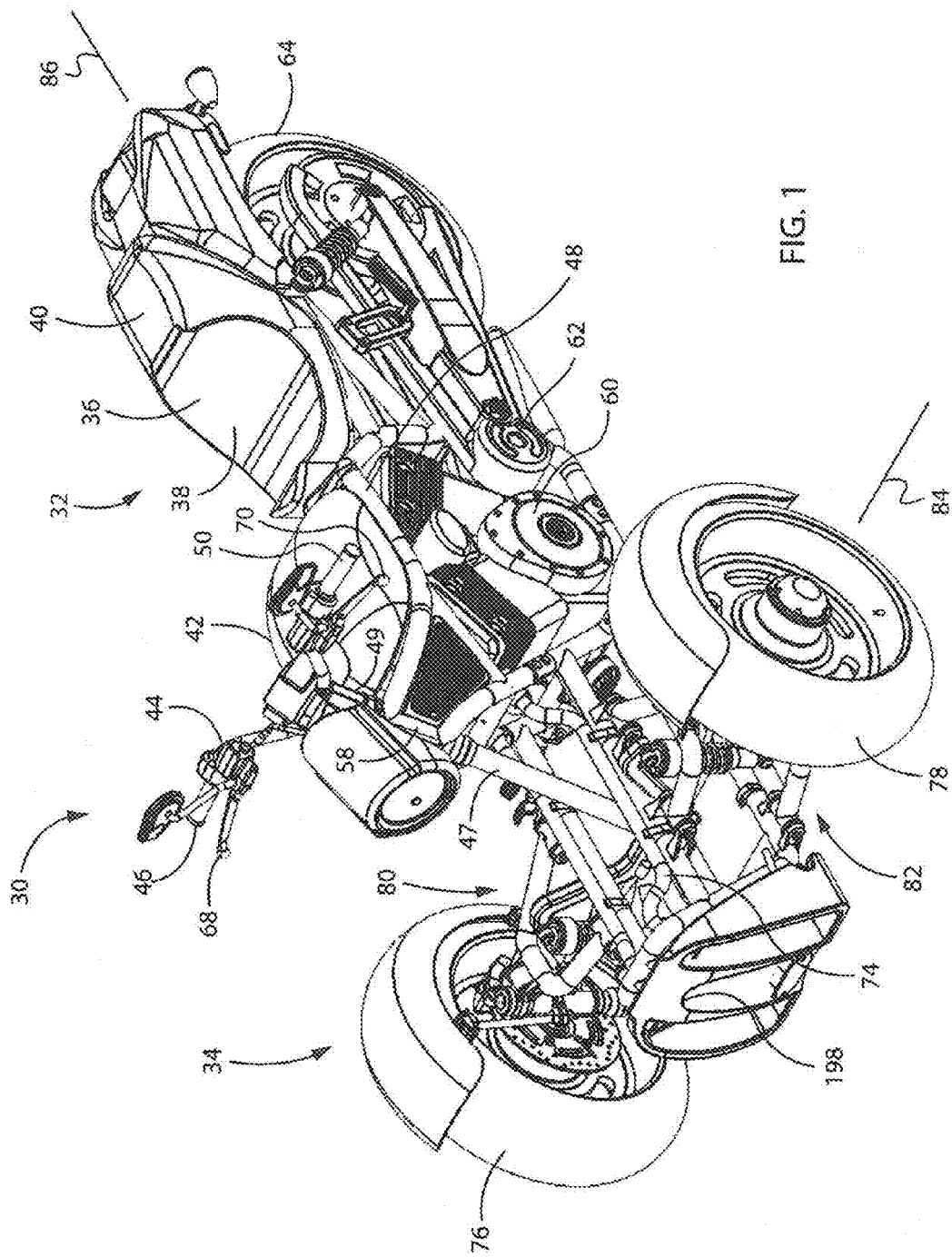
FIG. 1 is a perspective view of a commercially available two-wheeled motorcycle converted into a three-wheeled vehicle with a wheel count conversion kit according to one embodiment of the invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manna to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

FIG. 1 shows a motorcycle assembly or simply a motorcycle 30 that is defined by a rear portion 32 of a commercially available two wheeled motorcycle wherein the singular front wheel assembly has been removed and motorcycle 30 has been equipped with a front wheel count conversion kit 34, referred to hereinafter simply as kit 34, according to a first embodiment of the invention. Motorcycle 30 includes a seat 36 having an operator position 38 and an optional passenger position 40. The fuel tank 42 is oriented generally forward of seat 36 and rearward of a handlebar assembly 44. Preferably, kit 34 is configured to accommodate usage of handlebar assembly 44 associated with the commercially available two-wheeled motorcycle.

Handlebar assembly 44 includes a right-band grip 46 and a left-hand grip 50 that are disposed near the generally opposite longitudinal ends thereof. Handlebar assembly 44 is connected to a steer tube as disclosed further below so as to be pivotably connected to a frame assembly 48 of motorcycle 30. More specifically, the steer tube to which handlebar assembly 44 is connected passes through and pivotably cooperates with a neck or head tube 58 defined by frame assembly 48 of rear portion 32 of motorcycle 30. As explained further below, a frame associated with kit 34 includes a stem or support tube 47 that is secured to the frame of kit 34. Support tube 47 is oriented to be aligned with head tube 58 such that the steering shaft or steer tube passes through the support tube and head tube 58 and is rotatable relative thereto. The alignment of support tube 47 with head tube 58 allows transfer of at least a portion of the load associated with utilization of kit 34 into the rigid and robust structure associated with frame assembly 48 of motorcycle 30.

Rear portion 32 of motorcycle 30 includes a power source, such as an engine 60, that is connected to a transmission 62 and a powertrain associated with operation of a rear wheel 64. Operator interaction with handlebar assembly 44, the controls; such as throttle, clutch, and brake controls associated therewith; and/or one or more foot pedals control operation of motorcycle 30.

Handlebar assembly 44 includes a front wheel brake lever handle or brake lever 68 and a clutch handle 70 that are associated with right-hand grip 46 and left-hand grip 50, respectively. As commonly understood, handlebar assembly 44 includes a twist throttle that is commonly associated with right-hand grip 46. The brake and clutch levers are in proximity to the respective right and left hand grips 46, 50 so as to be gripped by a respective operators hand to manipulate operation of the front brakes and/or the clutch associated with operation of motorcycle 30.

As alluded, to above, handlebar assembly 44 is secured to a steer tube 49 (FIG. 3) that extends through head tube 58 of frame assembly 48 and support tube 47 such that a lower distal end of steer tube 49 cooperates with a steering assembly associated with kit 34 and an upper distal end of steer tube 49 can be secured to handlebar assembly 44 such that turning instructions imparted to handlebar assembly 44 are communicated to a steering assembly associated with kit 34. Said in another way, rotation of handlebar assembly 44 about an axis associated with steer tube 49 rotates steer tube 49 relative to support tube 47 and head tube 58 to effectuate turning of motorcycle 30.

It should be appreciated that in commercially available two wheel motorcycle configurations, steer tube 49 is customarily attached to a front fork assembly that includes a single front wheel that is captured between a pair of dampers or shock absorbers whose lower end defines the axis of rotation associated with rolling operation of the individual front wheel. FIG. 1 shows motorcycle 30 with the individual front wheel and fork assembly removed therefrom and replaced with kit 34. Preferably, the front wheel, and any brake assembly associated therewith, associated with the two wheeled motorcycle, and is usable with kit 34 such that kit 34 need only include a single supplemental front wheel and/or brake assembly to provide the two front wheeled configuration of motorcycle 30.

As shown in FIGS. 1-4, kit 34 includes a center-frame assembly or space frame 74 that is connectable to frame 48 of the rear portion 32 of motorcycle 30 without physical alteration of any of the discrete members of frame 48 as disclosed further below. As used herein, the phrase physical alteration is used to define manipulations of the size, shape, or orientation of the frame of the underlying motorcycle aside from removal or replacement of any such members that are interconnected with customary removable or replaceable connection methodologies such as fasteners, nuts and bolts, threaded connections or the like. In a preferred embodiment, conversion of a motorcycle from a two wheel to a three wheel configuration requires no metal working such as cutting or welding of the frame associated with the underlying vehicle such that consumers with a basic mechanical aptitude and common tools such as pliers, wrenches, ratchets, sockets, screwdrivers, and the like can efficiently convert a motorcycle from a two wheel configuration to a three wheel configuration.

Kit 34 includes a right-hand wheel assembly 76 and a left-hand wheel assembly 78 that are connected to opposite lateral sides of space frame 74. As alluded to above, kit 34 may include only one supplemental wheel assembly for those applications wherein an owner is satisfied with the appearance and/or performance of the front wheel already owned or customarily provided with rear portion 32 of motorcycle 30. It is further appreciated that kit 34 may include no wheel assemblies for those users that may already own multiple wheel assemblies or desire to acquire one or more wheel assemblies from third party vendors.

Figure 2:
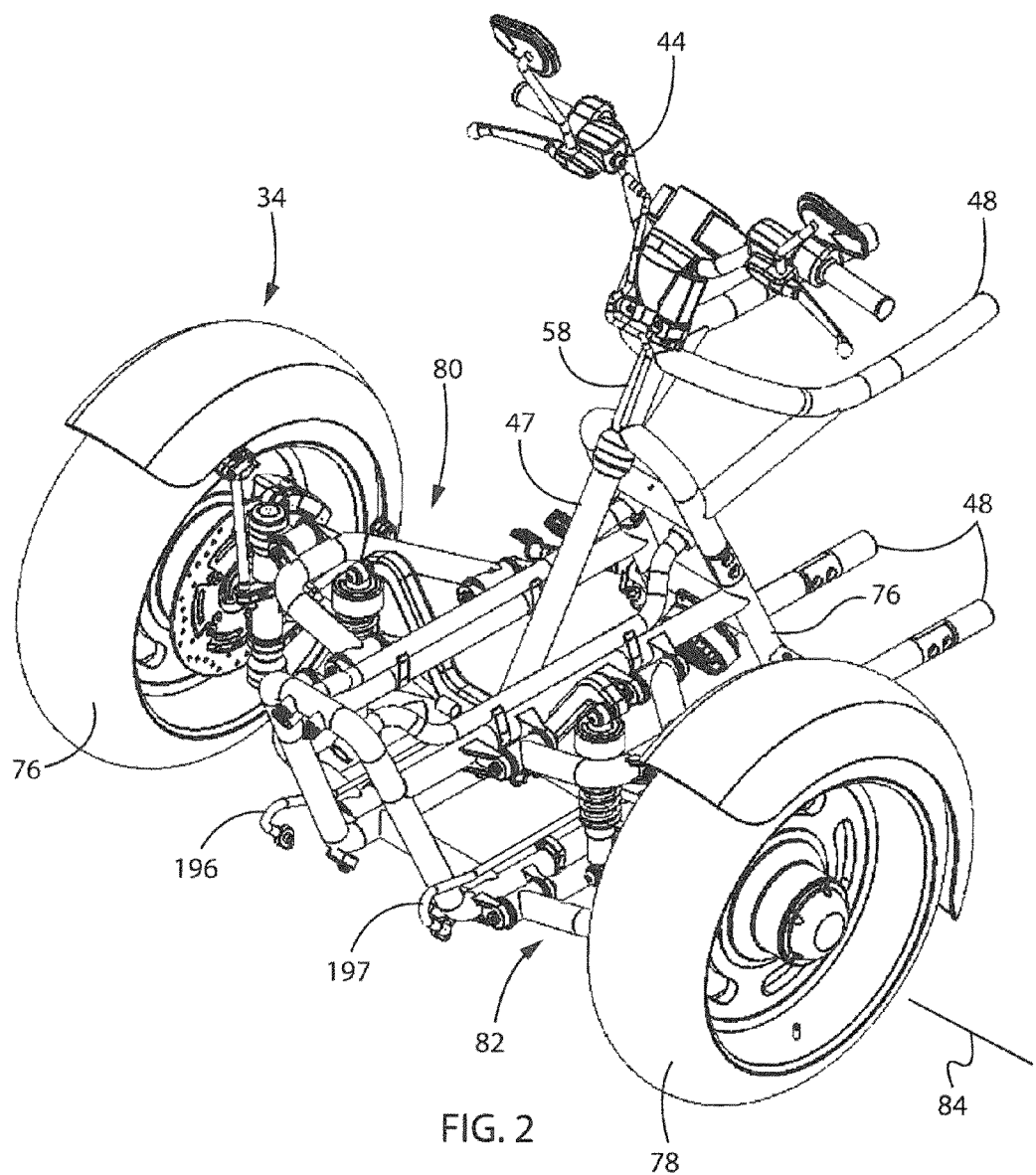
FIG. 2 is a view similar to FIG. 1 and shows the conversion kit removed from the underlying motorcycle.
Figure 3:
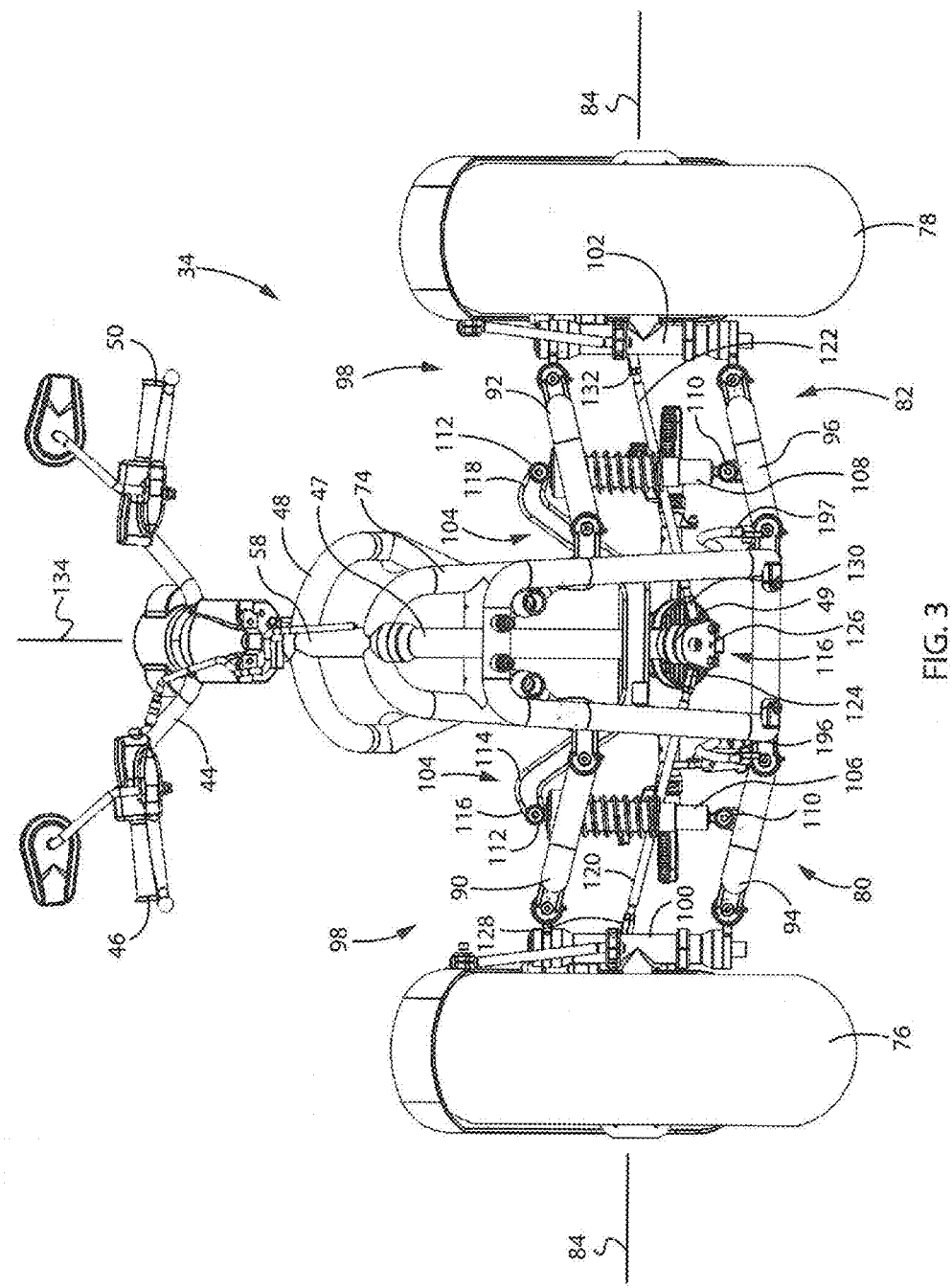
FIG. 3 is a front elevation view of the kit shown in FIG. 2.

Referring to FIGS. 1-3, kit 34 includes a first A-arm assembly 80 and a second A-arm assembly 82 that are disposed between a respective wheel assembly 76, 78 and space frame 74. A-arm assemblies 80, 82 offset the respective wheel assemblies 76, 78 in opposite outward lateral directions, indicated by axis 84, relative to space frame 74 and a longitudinal axis, indicated by line 86, of motorcycle 30. It should be appreciated that axis 86 is associated with a straightforward direction of travel of motorcycle 30 and manipulation of handlebar assembly 44 relative thereto effectuates turning operations of motorcycle 30.

Figure 4:
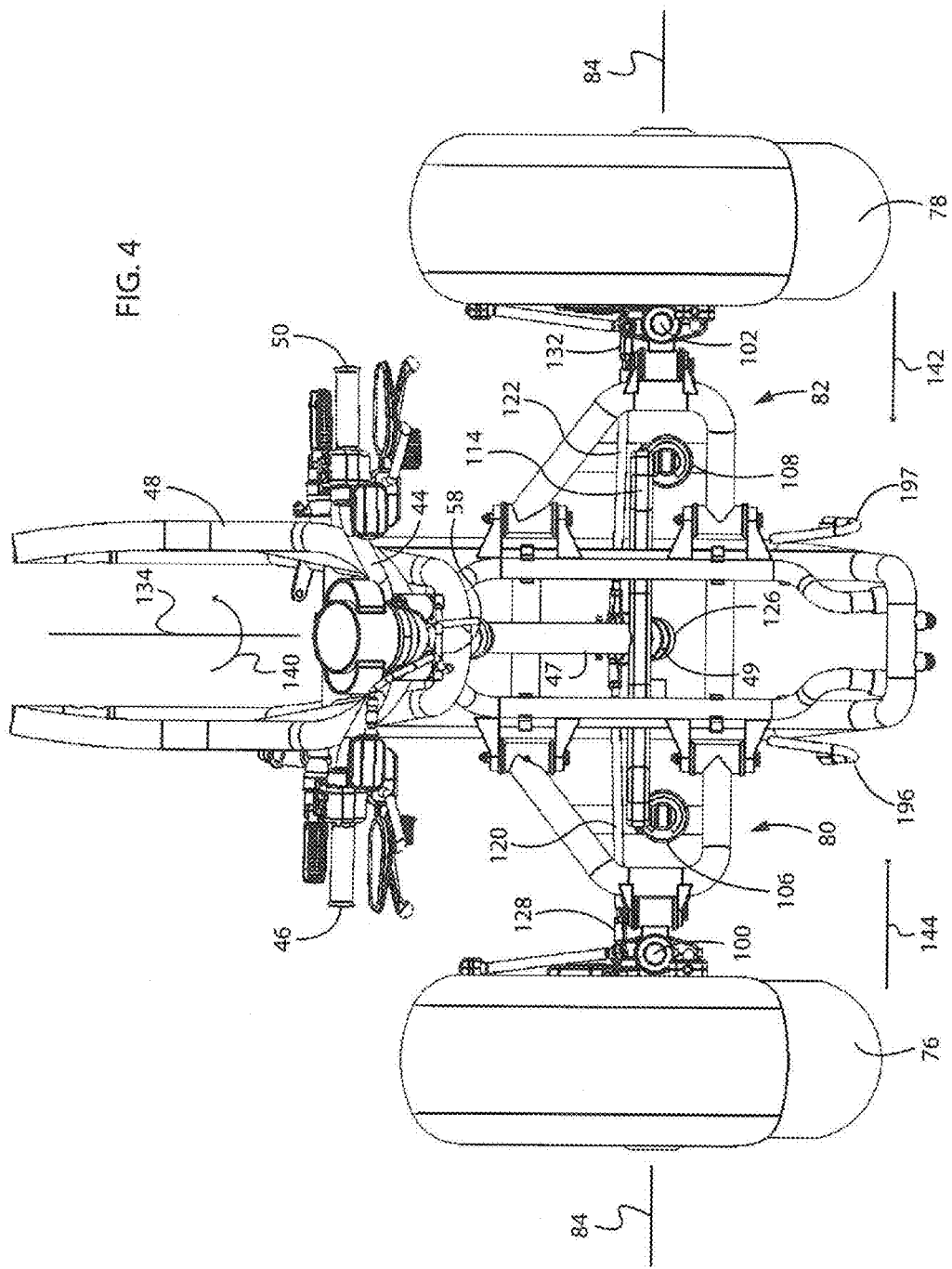
FIG. 4 is a top plan view of the kit shown in FIG. 2.

Referring to FIGS. 2-4, each A-arm assembly 80, 82 includes an upper A-arm 90, 92 and a lower A-arm 94, 96, respectively. It is appreciated that each A-arm has a generally smooth curvilinear shape that can be formed by bending or contouring a unitary or continuous member or the interconnection during manufacture, via welding or the like, of a plurality of discrete members to achieve the desired shape of the respective A-arm. A lateral outboard end 98 of each A-arm 90, 92, 94, 96 is pivotably connected to a respective steering arm or wheel mount or support 100, 102 that is associated with a respective wheel assembly 76, 78. A laterally inboard end 104 of each A-arm 90, 92, 94, 96 is pivotably connected to space frame 74 at respective upper and lower orientations. Understandably, one or more bearings, bushings or the like are preferably provided at each pivotable connection between a respective A-arm 90, 92, 94, 96 and space frame 74 as well as the pivotable or rotatable connected between each respective A-arm 90, 92, 94, 96 and a respective wheel assembly 76, 78. It is further appreciated that such rotational associations can be provided in a generally sealed configuration and/or include structures such as a grease fitting for maintaining lubrication between the structures that are rotationally associated with one another.

Each A-arm assembly 80, 82 also includes a damper, shock absorber, or simply a shock 106, 108. A first end 110 of each shock 106, 108 is pivotably connected to a respective lower A-arm 94, 96 and a second end 112 of each shock is pivotably connected to a cross arm or cross bar 114. Cross bar 114 extends in a lateral direction through a volume 115 whose perimeter is defined by space frame 74. Cross bar 114 includes a first end 116 that is connected to second end 112 of shock 106 and a second end 118 of cross bar 114 is connected to second end 112 of shock 108. Cross bar 114 is secured to space frame 74 and support tube 47 and oriented to cooperate with a respective end of shocks 106, 108. Preferably, cross bar 114 is positionally fixed, and preferably permanently affixed, such as via one or more fasteners or weldments to space frame 74. Cross bar 114 communicates a portion of the loading associated with kit 34 to the neck or head tube 58 of frame 48 of rear portion 32 of motorcycle 30. It is appreciated that cross bar 114 could alternatively be fully supported via cooperation with support tube 47 and shocks 106, 108 such that the damping performance of shocks 106, 108 relative to translation of discrete wheel assemblies 76, 78 during operation of motorcycle 30 is communicated to head tube 58 rather than to space frame 74.

Kit 34 includes a first tie rod 120 and a second tie and 122 that extend more so in lateral direction 84 then longitudinal direction 86. A first end 124 of tie rod 120 is connected to a yoke 126 and a second end 128 of tie rod 120 is connected to wheel mount 100. In a similar manner, a first end 130 of tie rod 122 is also connected to yoke 126 and a second end 132 of tie rod 122 is connected to wheel mount 102. Yoke 126 is connected to steer tube 49 such that rotation of handlebar assembly 44 about a longitudinal axis, indicated by line 134 (FIG. 3), rotates steer tube 49 about axis 134 relative to head tube 58 and support tube 47 and effectuates lateral translation of tie rods 120, 122 in a common lateral direction and thereby rotation of wheel mounts 100, 102 relative to A-arm assemblies 80, 82 during a steering activity.

As shown best of FIG. 4, cross bar 114 is contained within the horizontal footprint defined by space frame 74 and A-arm assemblies 80, 82 whereas ends 128, 132 of respective tie rods 120, 122 are disposed laterally outboard relative to the footprint defined by the A-arm assemblies 80, 82. Tie rods 120, 122 are pivotably connected to steer tube 49 via yoke 126. Tie rods 120, 122 cooperate with yoke 126 and respective wheel mounts 100, 102 such that counterclockwise rotation of handlebar assembly 44, indicated by arrow 140, relative to frame 48, support tube 47, and head tube 58 rotates steer tube 49 in direction 140 resulting in translation of tie rods 120, 122 in direction 142 to effectuate a left-hand turning activity. Rotation of handlebar assembly 44 in an opposite or clockwise rotational direction results in translation of tie rods 120, 122 in a generally opposite lateral direction, indicted by line 144, thereby generating a right-hand turning activity. As should be appreciated, rotation of handlebar assembly 44 about the axis defined by support tube 47 and head tube 58 yields concurrent movement of both the left and right hand wheel assemblies 76, 78.

Figure 5:
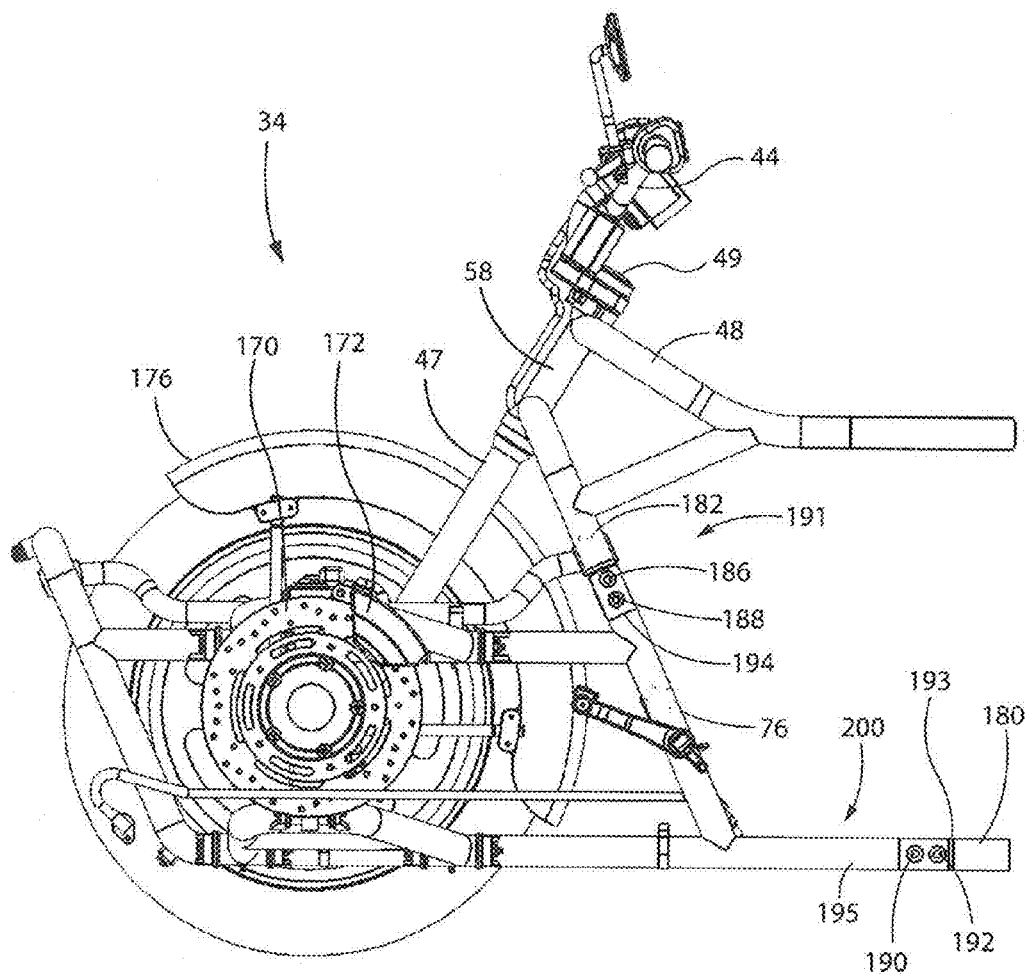
FIG. 5 is a side elevation view of the kit shown in FIG. 2
Figure 6:
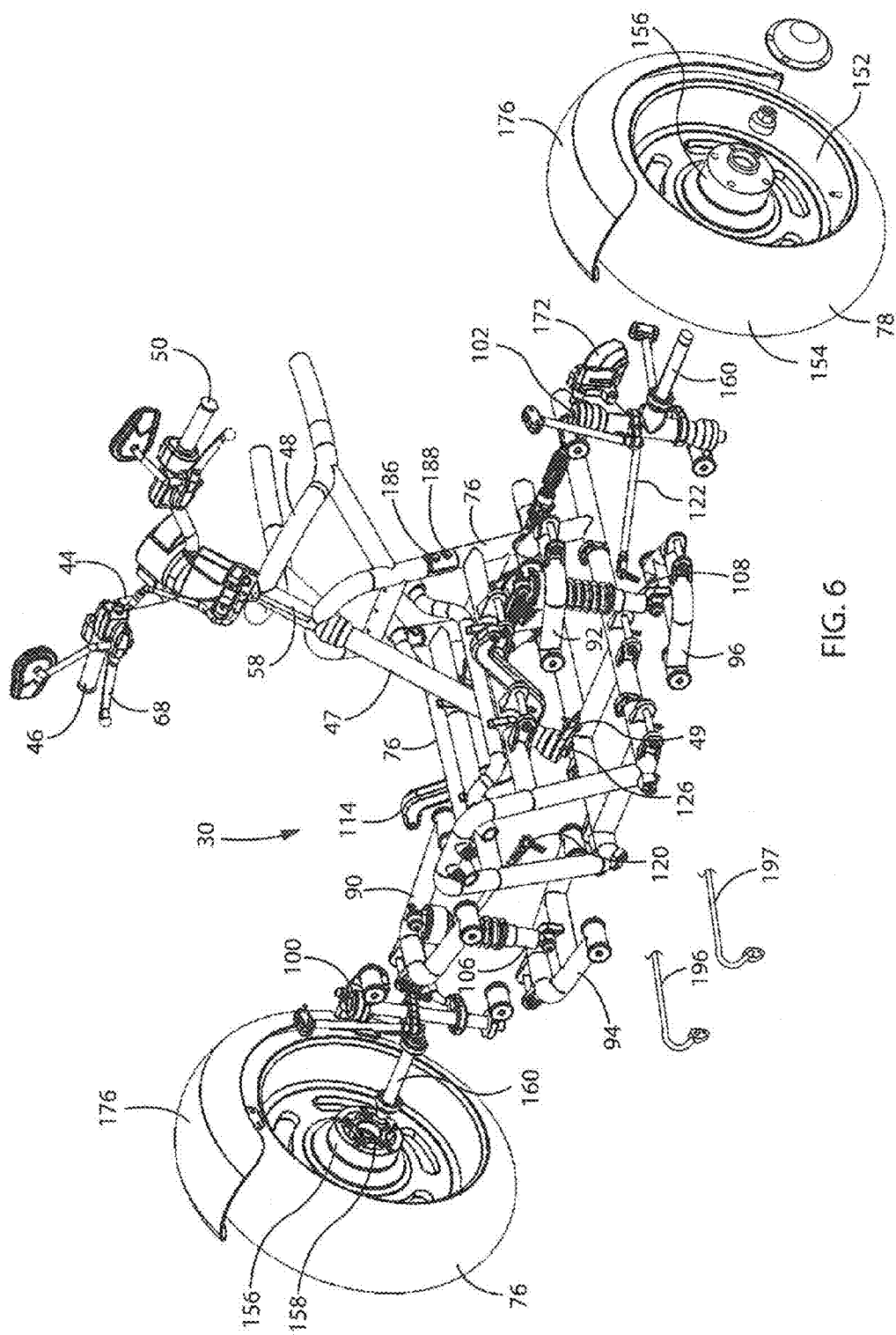
FIG. 6 is an exploded view of the kit shown in FIG. 2.

Referring to FIGS. 5 and 6, each wheel assembly 76, 78 includes a wheel 150, 152 having a tire 154 disposed about a circumference thereof. Each wheel 150, 152 includes a hub 156 that defines an opening 158 that is shaped to receive an axle 160 formed with or secured to the respective wheel mount 100, 102. Each wheel assembly 76, 78 preferably includes a brake rotor or disk 170 that is attached to the respective wheel 150, 152 and which rotationally cooperates with a caliper 172 that is supported by a respective wheel mount 100, 102. Each caliper 172 is operationally connected to brake lever 68 associated with handlebar assembly 44 such that operation of brake lever 68 effectuates stopping of each of wheel assemblies 76, 78. Preferably an elongated connector, such as brake cable or line extends between each caliper 172 and is operationally connected to a brake system associated with rear portion 32 of motorcycle 30 such that signals associated with movement of brake lever 68 are communicated concurrently to each caliper 172. Each wheel assembly 76, 78 also preferably includes an optional fender 176 that is associated in close proximity to a respective tire 154 so as to reduce the possibility of dirt, rain, and/or road debris being projected toward the operator during operation of motorcycle 30.

Still referring to FIGS. 5 and 6, space frame 74 is constructed to removably cooperate with frame assembly 48 of rear portion 32 of motorcycle 30. Frame 48 associated with rear portion 32 of motorcycle 30 includes a belly bar that extends between a lower frame tube 180 and an upper frame tube 182 of frame 48. One or more fasteners 186, 188, 190, 192 cooperate with respective ends 191, 193 of lower frame tube 180 and upper frame tube 182 to secure the belly bar frame tube therebetween. Removal of the belly bar frame member allows respective ends 191, 193 of tubes 180, 182 of frame 48 to accommodate and cooperate with respective rearward facing ends 194, 195 of space frame 74 of kit 34. Steer tube 49 extends from yoke 126 at an orientation that allows steer tube 49 to rotationally cooperate with support tube 47 and head tube 58 of frame 48 of rear portion 32 of motorcycle 30 when rearward facing ends 194, 195 of space frame 74 are engaged with ends 191, 193 of tubes 180, 182 of frame 48 of rear portion 32 of motorcycle 30. Said in another way, kit 34 is constructed to allow steer tube 49 to cooperate with head tube 58 of a commercially available motorcycle such that only customary hand and hand-held power tools are required to convert a commercially available two wheeled motorcycle into a confirmation of a three wheeled motorcycle having two front wheels.

That is, the various pivotable or otherwise relatively movable connections between space frame 74; A-arms 90, 92, 94, 96; dampers 106, 108; wheel mounts 100, 102; cross bar 114; tie rods 120, 122; and yoke 126 can be accomplished with only a basic mechanical understanding and with various typical mechanical fasteners such as nuts and bolts, bolts and threaded cavities, screws, pins etc. to effectuate the removal of the single front wheel commonly associated with rear portion 32 of motorcycle 30 and replacement thereof with the components of kit 34.

Similar such fasteners can be utilized to establish the mechanical connection between ends 194, 195 of space frame 74 and vacated ends of tubes 180, 182 associated with frame 48 of rear portion 32 such that conversion of motorcycle 30 from a two wheeled configuration to a configuration having two front wheels and a individual rear wheel to be effectuated by users having limited mechanical aptitude and/or ability. It is further envisioned that kit 34 can include one or more fluid, hydraulic, or electrical elongated connectors adapted to cooperate with the underlying systems of motorcycle 30 in a plug-and-play modality to effectuate communication of the operational instructions and fluids to the alternate front wheel assemblies 76, 78 of kit 34.

It is further envisioned that wheel assembly 76, 78 can be configured to accommodate use of the single front wheel originally associated with rear portion 32 of motorcycle 30 such that kit 34 only need include a single supplemental or secondary wheel to provide the complete motorcycle 30 having the two front wheeled configuration shown in FIG. 6. Such consideration limits the expense to the end-user that only an individual additional wheel would need to be purchased to complete the conversion of any particular motorcycle configuration. Alternatively, it is envisioned that kit 34 include no supplemental wheels such that the user can choose to purchase a single front wheel for use with the original front wheel or purchase two front wheels when an alternate front wheel appearance is desired.

Referring to FIGS. 1-5, it is further envisioned that kit 34 can include one or more elongated connectors 196, 197 associated with accommodating movement of a heat sink, such as a radiator 198, from an original position wherein the radiator is associated with a belly bar or a forward facing portion of the frame 48 of the rear portion 32 of motorcycle 30 to a forward position associated with usage of kit 34. It is appreciated that radiator 198 can be constructed to provide cooling of both an engine oil fluid and a fluid associated with a water jacket of engine 60. It is appreciated that some original equipment manufacturers (OEM's) may provide products having air cooled and/or two-cycle engines wherein radiator 198 may not be necessary to maintain operability of the underlying power source. Said in another way, connectors 196, 197 are optional as a function of the specific construction associated with the underlying motorcycle and/or the desire to move radiator 198 to the more forward orientation associated with utilization of kit 34.

Preferably, connectors 196, 197 are provided in a plug and play modality wherein one end of the connector cooperates with the underlying radiator and/or oil cooler and the other end of respective elongate connector 196, 197 can be connected to a corresponding connection or port associated with the original or two-wheel vehicle orientation associated with the discrete and/or combined radiator/oil cooler loops associated with radiator 198. It is further appreciated that relocation of radiator 198 can be for functional reasons associated with maintaining the desired flow of air through the radiator/cooler, to better accommodate the cooperation of the space frame with the underlying vehicle frame, and/or for aesthetic reasons associated with the position of the radiator/cooler relative to the remainder of the three wheeled vehicle configuration.

Figure 7:
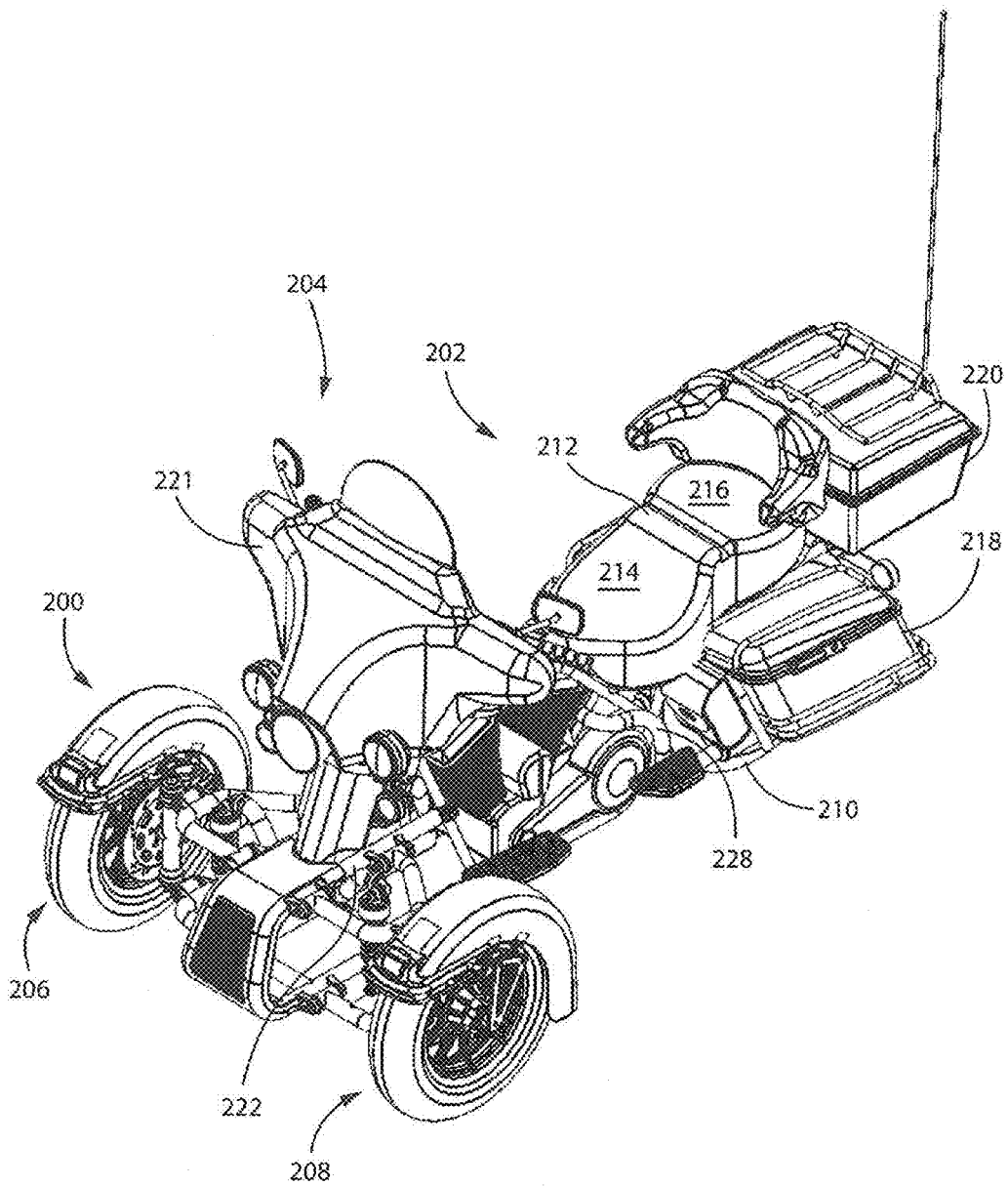
FIG. 7 is a view similar to FIG. 1 of another commercially available two-wheeled motorcycle converted into a three-wheeled vehicle with a wheel count conversion kit according to another embodiment of the invention.

FIGS. 7-12 show various views of a motorcycle and a front wheel count conversion kit 200 according to another embodiment of the invention. Referring to FIG. 7, and like kit 34, kit 200 is constructed to cooperate with a rear portion 202 of a commercially available two wheeled motorcycle so as to define a three wheeled motorcycle 204 having two forward oriented wheel assemblies 206, 208 and a single rearward oriented wheel 210. Rear portion 202 of motorcycle 204 also includes a seat 212 that defines an operator position 214 and an optional passenger position 216.

Figure 8:
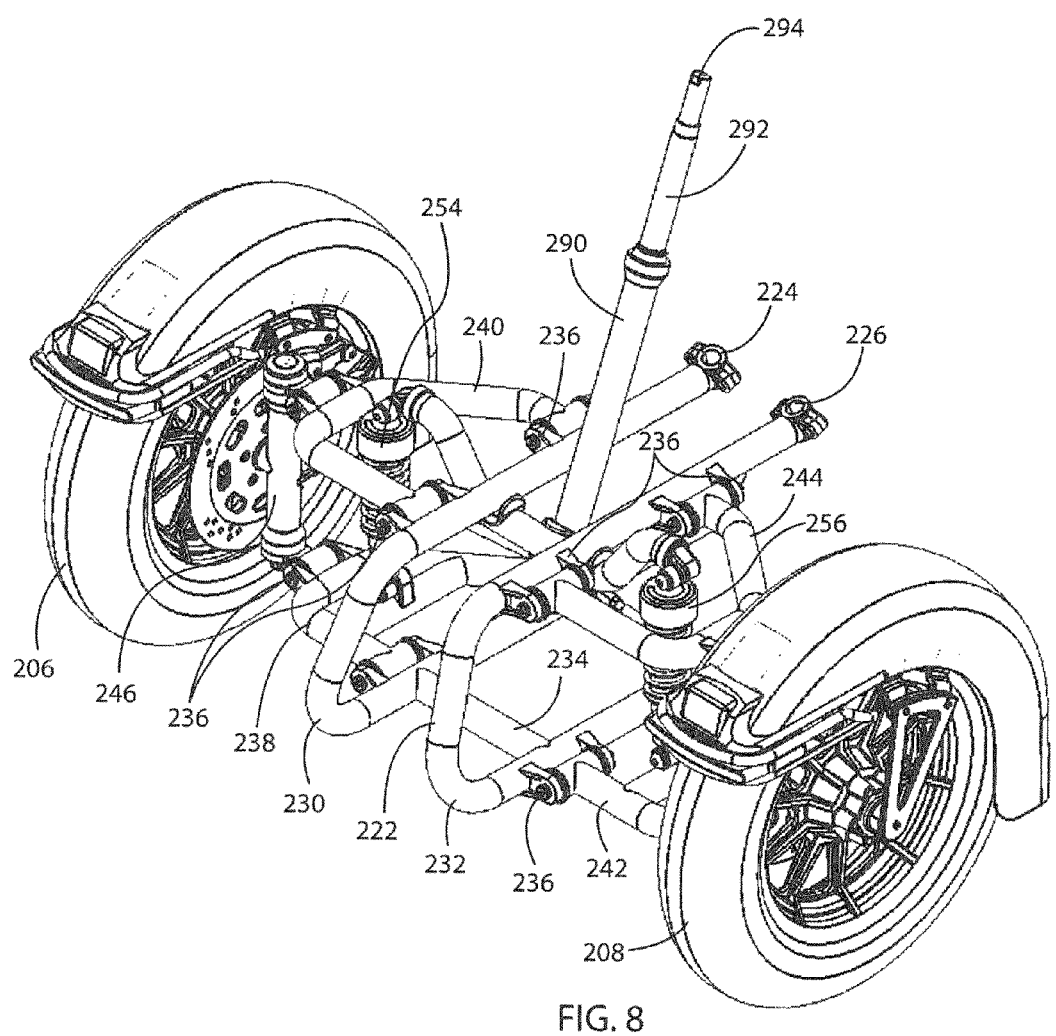
FIG. 8 is a view similar to FIG. 7 and shows the conversion kit removed from the underlying motorcycle.

Set up in more of a touring configuration than a sport configuration, motorcycle 204 can include one or more saddlebags 218, a rear oriented storage box 220, and/or one or more plastic or metal cowlings and/or fairings 221. Referring to FIGS. 7 and 8, kit 200 includes a center-frame assembly or space frame 222 having one or more rear facing ends 224, 226 constructed to cooperate with the frame assembly 228 (FIG. 7) of rear portion 202 of motorcycle 204. Space frame 222 includes a first generally U-shaped member 230 and a second generally U-shaped member 232 that are connected to one another via one or more crossbars 234. As explained further below, space frame 222 is constructed to be secured to a frame assembly of rear portion 202 of motorcycle 204 in a manner that does not require removal, replacement, or reconfiguration of any portion of the frame associated with the commercially available two wheeled motorcycle.

Figure 9:
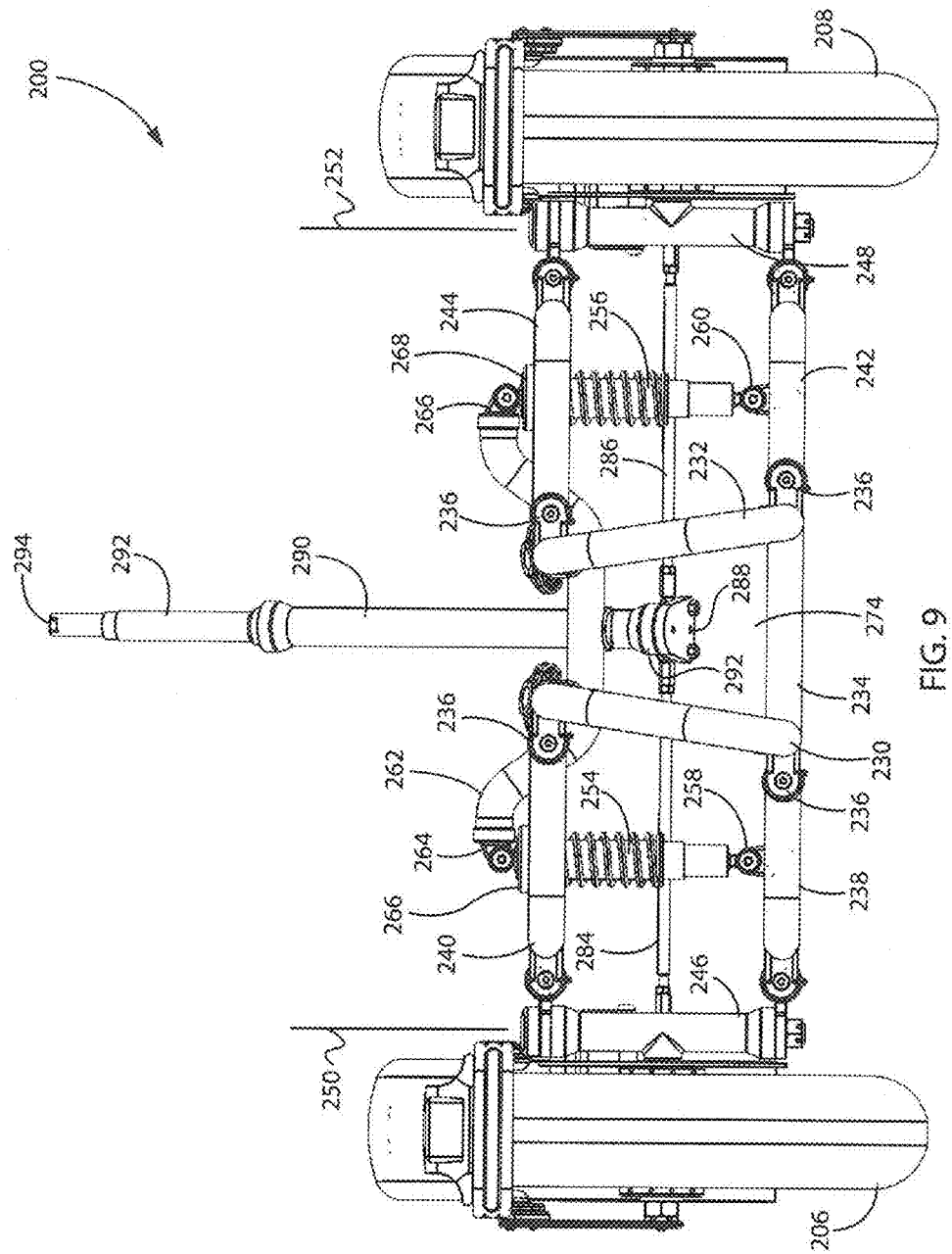
FIG. 9 is a front elevation view of the kit shown in FIG. 7.

U-shaped members 230, 232 of space frame 222 of kit 200 each include a number of laterally outwardly directed mounts 236 that are each constructed to pivotably cooperate with a respective right side lower A-arm 238, a right side upper A-arm 240, a left lower A-arm 242, and a left upper A-arm 244. As used herein, the respective right and left lateral orientations should be appreciated as being associated relative to an orientation of an operator associated with seat 212. Each A-arm 238, 240, 244, 242 extends in a respective lateral outward direction relative to space frame 222 and is pivotably connected to a respective steering arm or left wheel mount 246 and right wheel mount 248 (FIG. 9). Wheel mounts 246, 248 are each constructed to pivot about a generally vertical axis, indicated by lines 250, 252 and relative to the respective upper and lower A-arm pairs 238, 240 and 242, 244, to allow lateral rotation of the respective front wheel assembly 206, 208 and relative to the frame associated with rear portion 202 of motorcycle 204.

Figure 10:
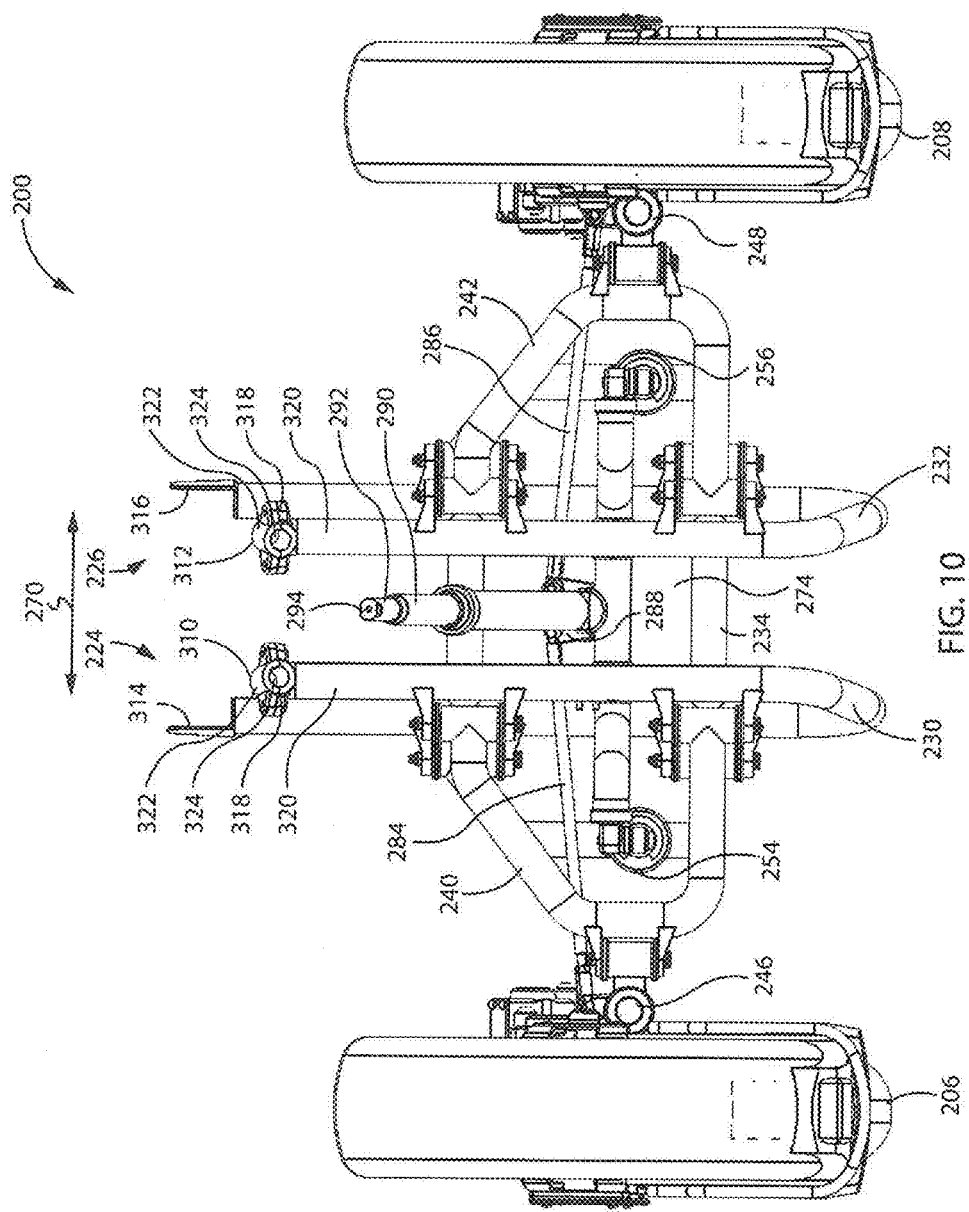
FIG. 10 is a top plan view of the kit shown in FIG. 7.

Referring to FIGS. 8-10, a first damper or shock 254 and a second damper or shock 256 is associated with each of the right and left lateral A-arm pairs 238, 240 and 242, 244. A lower end 258 of shock 254 is pivotably connected to lower right side A-arm 238 and a lower end 260 of shock 256 is pivotably connected to lower left side A-arm 242. A cross arm or cross bar 262 extends laterally across space frame 222 and includes a first end 264 that is connected to an upper end 266 of shock 254. A second end 267 cross bar 262 is pivotably connected to an upper end 268 of shock 256. Cross bar 262 is oriented to extend in a general lateral direction, as indicated by line 270 (FIG. 10), and contoured to extend between a cavity or space 274 bounded by U-shaped members 230, 232 of space frame 222. Such a configuration provides a compact vertical and horizontal footprint of kit 200 and allows movement of left and right wheel assemblies 206, 208 in a manner responsive to the suspension performance of the other of the left and right wheel assemblies 206, 208.

Referring to FIGS. 9 and 10, kit 200 includes a first tie rod 284 and a second tie rod 286 that extend in generally opposite lateral directions 269 between a yoke 288 and the respective wheel mount 246, 248. Yoke 288 is connected to a steering shaft or steer tube 292 that extends in a generally upward and rearward direction through a support tube or stem tube 290. Stem tube 290 is secured to cross bar 262 and oriented to cooperate with a neck or head tube associated with frame assembly 228 associated with rear portion 202 of motorcycle 204. Steer tube 292 slidably and rotationally cooperates with stem tube 290 of kit 200 and the head tube of frame 228 of rear portion 202 of motorcycle 204. Referring briefly back to FIG. 7, it should be appreciated that the head tube with which steer tube 292 cooperates is disposed generally behind faring 221. An upper end 294 of steer tube 292 is constructed to be secured to a handlebar assembly 296 provided with rear portion 202 of motorcycle 204. It is appreciated that steer tube 292 may be included with kit 200 or that yoke 288 be constructed, such as by having a generally elongate construction, to cooperate with the steer tube originally provided with rear portion 202 of motorcycle 204.

Figure 11:
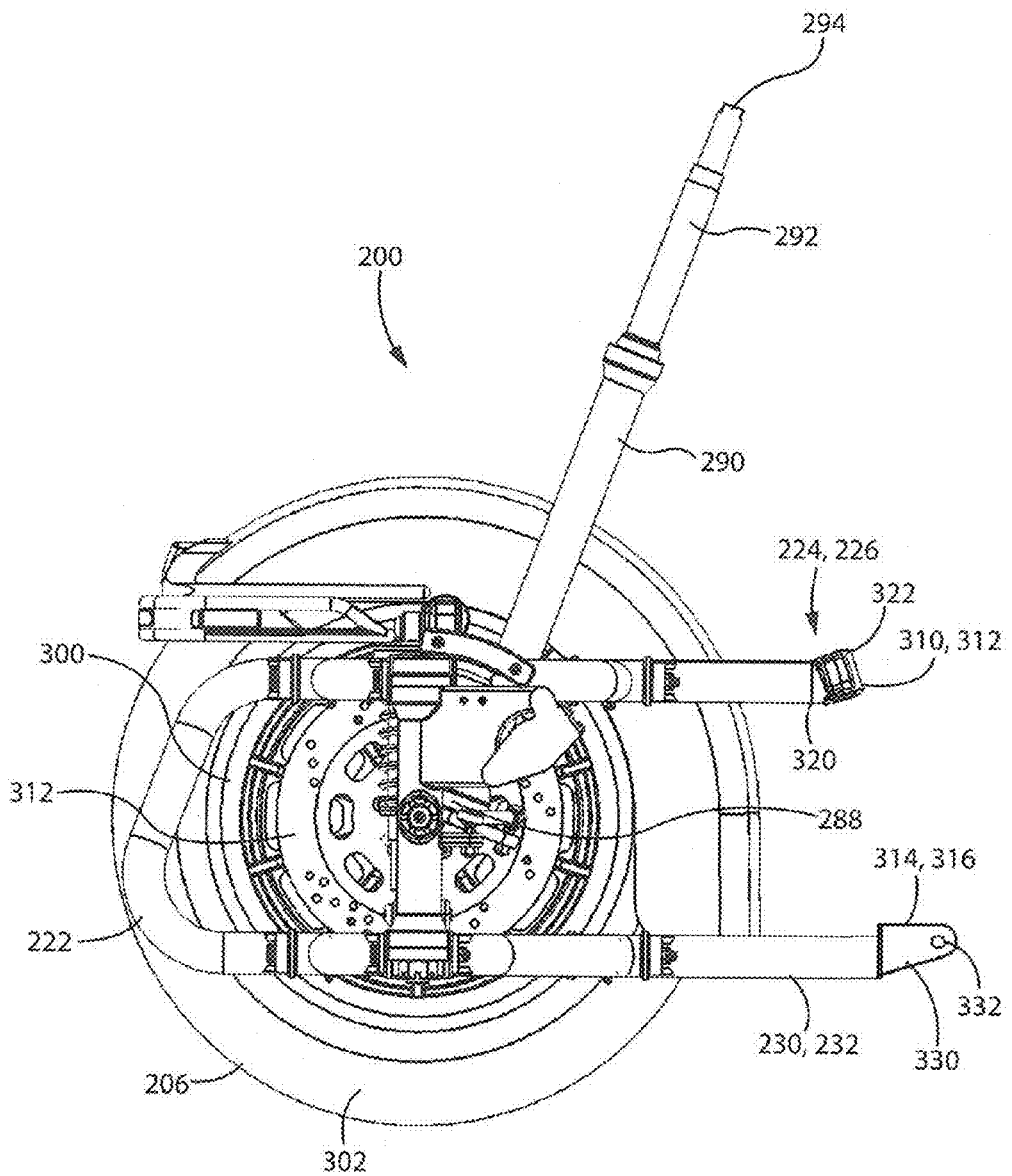
FIG. 11 is a side elevation view of the kit shown in FIG. 7.
Figure 12:
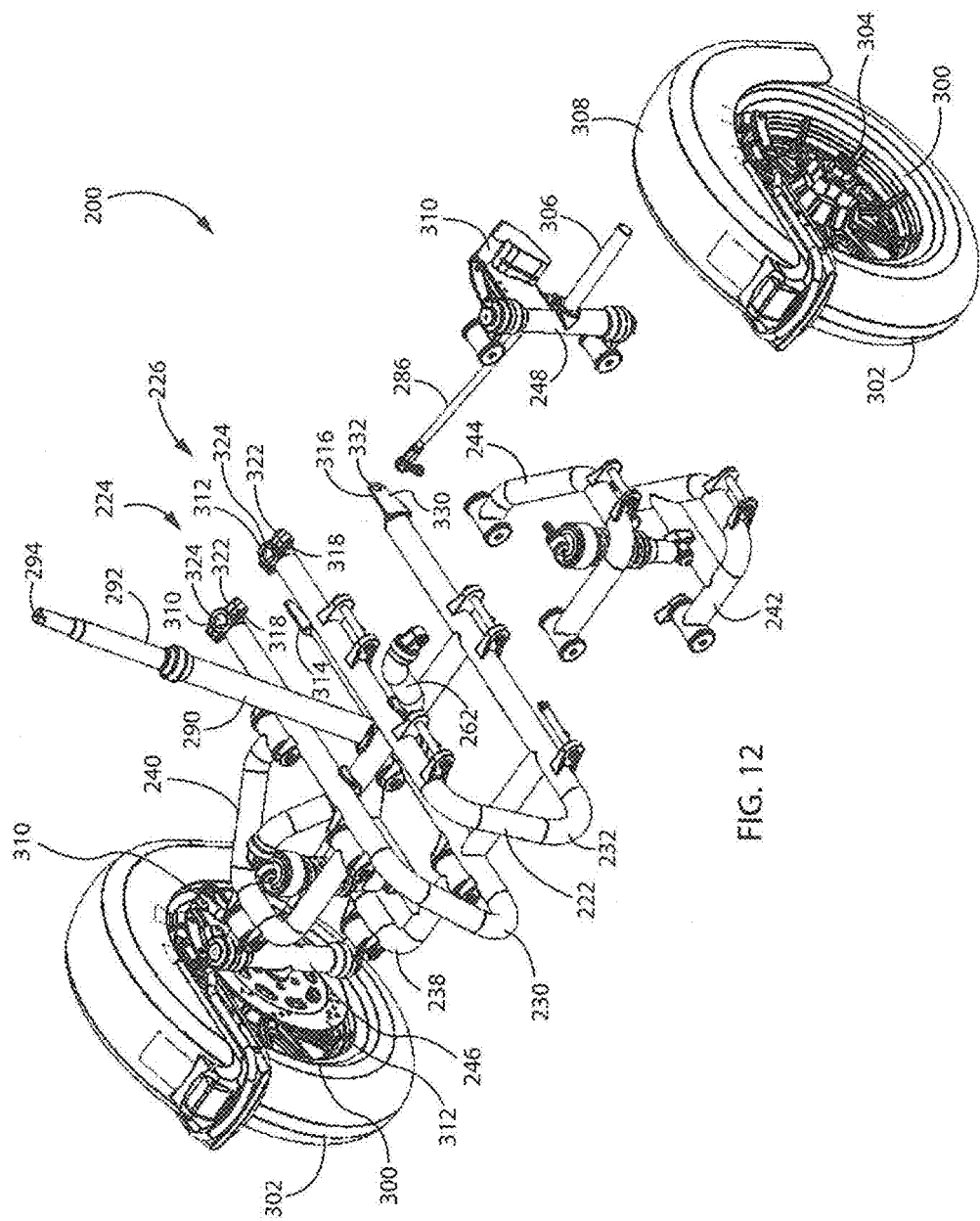
FIG. 12 is an exploded view of the kit shown in FIG. 7.

Referring to FIGS. 10-12, each wheel assembly 206, 208 includes a tire 302 that extends circumferentially about a wheel 300. Each wheel 300 defines a bore 304 (FIG. 12) the slidably cooperates with the shaft for axle 306 that extends from a respective wheel mount 246, 248. An optional fender 308 is oriented about a portion of the radially outward directed surface of each respective tire 302. A caliper 309 is attached to each wheel mount 246, 248 and is oriented to cooperate with a brake disk 311 associated with a respective wheel assembly 206, 208. It should be appreciated that one or more rotational elements, such as bearings or like, are preferably provided between each respective wheel assembly 206, 208 and the stern or axle 306 associated with each wheel assembly 206, 208.

Still referring to FIGS. 10-12, rear facing ends 224, 226 of U-shaped portions or members 230, 232 of space frame 222 each include a respective clamp portion or an upper connection interface 310, 312 and a lower connection interface 314, 316, respectively. Each connection interface 310, 312, 314, 316 is shaped to cooperate with a portion of frame assembly 228 (FIG. 7) of rear portion 202 of motorcycle 204. Each upper connection interface 310, 312 includes a first portion 318 that is secured to a tubular fore and aft oriented members or elongated portion 320 of space frame 222. As shown in FIG. 10. each elongated portion 320 of center-frame assembly or space frame 333 extends in a generally fore and aft or longitudinal direction that is generally transverse to lateral direction 270 (FIG. 10) relative to the underlying motorcycle assembly. One or more of elongated portions 320 may have an adjustable length. A second portion 322 of each upper connection interface 310, 312 removably cooperates with a respective first portion 318 of connection interfaces 310, 312 so as to define a cavity 324 that is bounded by the cooperation of the respective portions 318, 322 of the respective upper connection interface 310, 312. One or more fasteners, such as screws or bolts, cooperate with each respective first and second portions 318, 322, so as to provide a secure connection therebetween. Each cavity 324 of each upper connection interface 310, 312 is shaped and oriented to cooperate with a forward facing portion of frame assembly 228 (FIG. 7) of rear portion 202 of motorcycle 204.

Each lower connection interface 314, 316 includes a tab 330 having an opening 332 formed therein. Each tab 330 and opening 332 are also shaped and oriented to cooperate with frame assembly 228 of rear portion 202 of motorcycle 204. The upper connection interfaces 310, 312 and lower connection interfaces 314, 316 are oriented relative to one another so as to cooperate with frame assembly 228 of rear portion 202 of motorcycle 204 in a manner that does not require physical manipulation or alteration of the underlying frame assembly 228 to effectuate the connection therebetween. As those skilled in the art will appreciate, removal of the forward facing wheel assembly of most commercially available two wheeled motorcycles fully exposes the belly area of the frame assembly associated with the underlying motorcycle. Connection interfaces 310, 312 314, 316 are constructed and oriented to maintain the desired orientation of space frame 222 relative to frame assembly 228 to provide the desired orientation of yoke 288, stem tube 290, and steer tube 292 for cooperation of the stein tube 290 and the steer tube 292 with the head tube of the underlying motorcycle, in respective thrust loading radial loading. It should also be appreciated that, although kit 34 is constructed for cooperation with a frame having a removable belly frame member, kit 200 is constructed to cooperate with a motorcycle having a uniframe or generally singular member frame wherein only metal working would allow alteration to the shape of the underlying frame.

Although removed for clarity, it is further appreciated that kit 200 can include one or more elongate conductors or connectors, like connectors 196, 197 associated with kit 34, to facilitate a plug and play type of connectivity associated with the movement and addition of wheel assemblies 206, 208 and/or supplemental systems such as radiator or oil cooler associated with the commercially available two wheeled motorcycle configuration. That is, the user's designation of the desired adaption of a particular motorcycle configuration from a two wheeled configuration to a configuration having two front wheels and a single rear wheel can include a designation and/or consumers desire, when available, to relocate ancillary systems, such as the engine fluid cooling devices as an example, to positions other than the OEM orientation of the device. It is appreciated that such a designation or availability of such a configuration can be conveniently facilitated by providing the user with the fluid and/or mechanical connectors that facilitate the connectivity between the source of the operational instructions or fluid and the desired resultant location of the ancillary device when the underlying motorcycle is converted to the three wheeled configuration.

Kits 34 and 200 are constructed to allow a user to convert commercially available two wheeled motorcycles into motorcycles having two front wheels with use of only customary hand and hand held power tools such as wretches, sockets, ratchets, impact guns and the like. Kits 34, 200 allow users to convert conventional two wheeled motorcycles into three wheeled vehicles in a manner that also preferably allows utilization of near the entirety of the components, such as the wheel assembly and/or steer tube assemblies associated with the two wheeled motorcycle thereby limiting the cost and know how associated with converting a two wheeled motorcycle into a motorcycle have three total wheels wherein two wheels are oriented at the front of the vehicle. It is further appreciated that various kits may be provided wherein the space frame, and particularly the rearward facing ends thereof, are constructed, shaped, and oriented to cooperate with a frame assembly unique to a particular brand, make, or model of commercially available two wheeled motorcycle and in a manner that accommodates cooperation of the steering system associated with the underlying kit with the steer tube and/or head tube associated with the commercially available motorcycle. That is, it is envisioned user's be allowed to select a kit configured to cooperate with constructions unique to their particular vehicle or classes of vehicles and to do so in a manner that requires no physical alteration, aside from interaction with customary removable connectors, to the frame of their underlying vehicle.

Therefore, one embodiment of the invention includes a kit for converting a two wheeled motorcycle into a three-wheeled vehicle. The kit includes a first A-arm assembly and a second A-arm assembly. A steering arm is pivotably connected to each of the first and second A-arm assemblies, respectively, and an axle extends in an outward lateral direction from each steering arm. Each axle is constructed to rotationally support a wheel. Each of the first and second A-arm assemblies are pivotably connected to a center-frame or space frame assembly such that the first and second A-arm assemblies are oriented on opposite lateral sides of the center-frame. The kit includes a pair of tie rods that each has a first end that is connected to a respective steering arm and a second end that is positioned within a cavity bounded by the center-frame assembly. A support tube defined by a generally elongate body includes a first end that is secured to the center-frame assembly and a second end that oriented to engage a neck of a motorcycle frame. The support tube includes a passage that is formed therethrough and shaped to receive a steering shaft. A first end of the steering shaft is pivotably connectable to each tie rod and a second end of the steering shaft is oriented to extend through the neck of the motorcycle frame when the support tube is aligned with the neck of the motorcycle frame Another embodiment of the invention that is combinable with one or more of the other embodiments includes a three-wheeled vehicle that includes a frame that is constructed to support a seat generally above an engine. A transmission is connected to the engine such that a single rear wheel can be driven by operation of the engine. A head tube is defined by the frame and is constructed to support a handlebar that is configured to turn a single front wheel. A space frame is removably attachable to the frame when the single front wheel is removed therefrom. A right side suspension frame and a left side suspension frame are each pivotably attached to the space frame and extend in opposite lateral directions relative to a longitudinal axis of the frame. A right side wheel mount is attached to the space frame by the right side suspension frame and a left side wheel mount is attached to the space frame by the left side suspension frame. A first tie rod is connected to the right side wheel mount and a second tie rod is connected to the left side wheel mount. A yoke is connected to each of the first tie rod and the second tie rod. A rigid stem tube has a first end that is secured to the space frame and a second end that is oriented rearward and above the first end to engage the head tube when the space frame is connected to the frame. A steer tube extends between the handlebar and the yoke and extends through the head tube and the stem tube such that manipulation of the handlebar effectuates concurrent turning of the right side wheel mount and the left side wheel mount.

Another embodiment of the invention that is combinable with one or more of the above embodiments includes a method of converting a motorcycle from a two wheeled vehicle into a three-wheeled vehicle. The method includes removing a front fork and wheel assembly from engagement with a head tube of a commercially produced motorcycle. A space frame is attached to a forward facing portion of a frame of the commercially produced motorcycle without physically modifying any discrete member the underlying frame of the commercially produced motorcycle. A right, wheel mount and a left wheel mount are attached to the space frame and a tie rod is attached to each of the right wheel mount and the left wheel mount. A rigid steer tube is extendable through the head tube of the frame of the commercially produced motorcycle a stem tube connected to the space frame. A handlebar is connected to an upper end of the rigid steer tube. A lower end of the rigid steer tube is connected to each respective tie rod via a yoke such that twisting of the handlebar causes rotation of the rigid steer tube relative to the head tube and the stem tube and at least partly lateral translation of the tie rods relative to the space frame to effectuate concurrent rotation of each of the right and left wheel mounts relative to the space frame.

The present invention has been described above in terms of the preferred embodiments. Many changes and modifications can be made to the invention without departing from the spirit thereof and are within the scope of the appending claims.

What I claim is:

1. A kit for converting a motorcycle into a three-wheeled vehicle, the kit comprising:
    a first A-arm assembly and a second A-arm assembly;
    a steering arm pivotably connected to one of the first and second A-arm assemblies, respectively;
    an axle extending in an outward lateral direction from each steering arm, each axle constructed to rotationally support a wheel;
    a center-frame assembly having each of the first and second A-arm assemblies pivotably connected thereto such that the first and second A-arm assemblies are oriented on opposite lateral sides of the center-frame assembly, the center-frame assembly including a plurality of fore and aft oriented members wherein an aft end of each fore and aft oriented member includes a clamp portion that is shaped to overlap a portion of the motorcycle frame that is proximate thereto;
    a pair of tie rods each having a first end connected to a respective steering arm and a second end that is positioned within a cavity bounded by the center-frame assembly; and
    a support tube defined by a generally elongate body having a first end secured to the center-frame assembly and a second end that is oriented to engage a neck of a motorcycle frame, the support tube having a passage formed therethrough that is shaped to receive a steering shaft wherein a first end of the steering shaft is pivotably connectable to each tie rod and a second end of the steering shaft is oriented to extend through the neck of the motorcycle frame when the support tube is aligned with the neck of the motorcycle frame.

2. The kit of claim 1 wherein at least one of the plurality of fore and aft oriented members have an adjustable longitudinal length.

3. The kit of claim 1 further comprising a shock absorber associated with each A-arm assembly.

4. The kit of claim 3 wherein a first end of each shock is secured to the center-frame assembly and a second end of each shock absorber is secured to a respective A-arm assembly.

5. The kit of claim 4 wherein each A-arm assembly includes an upper A-arm and a lower A-arm and the steering arm is pivotably attached to each of the upper A-arm and the lower A-arm of a respective A-arm assembly.

6. The kit of claim 5 wherein the second end of each shock absorber is secured to the lower A-arm.

7. The kit of claim 1 further comprising one wheel that is the same as an original wheel of the motorcycle.

8. A three-wheeled vehicle assembly comprising:
    a frame constructed to support a seat generally above an engine;
    a transmission connected to the engine;
    a single rear wheel driven by operation of the engine;
    a head tube defined by the frame and constructed to support a handlebar configured to turn a single front wheel;
    a space frame that is removably attachable to the frame when the single front wheel is removed therefrom;
    a right side suspension frame and a left side suspension frame that are each pivotably attached to the space frame and extend in opposite lateral directions relative to a longitudinal axis of the frame;
    a right side wheel mount attached to the space frame by the right side suspension frame and a left side wheel mount attached to the space frame by the left side suspension frame;
    a first tie rod connected to the right side wheel mount and a second tie rod connected to the left side wheel mount;
    a yoke connected to each of the first tie rod and the second tie rod;
    a rigid stem tube having a first end that is secured to the space frame and a second end oriented rearward and above the first end to engage the head tube when the space frame is connected to the frame; and
    a steer tube extending between the handlebar and the yoke and extending through the head tube and the stem tube such that manipulation of the handlebar effectuates concurrent turning of the right side wheel mount and the left side wheel mount.

9. The three-wheeled vehicle of claim 8 further comprising a right front wheel and a left front wheel that are each connected to one of the right side wheel mount and the left side wheel mount, respectively.

10. The three-wheeled vehicle of claim 8 further comprising a pair of shocks wherein one end of one shock is connected to the right side suspension frame and one end of another shock is connected to the left side suspension frame and another end of each of the pair of shocks is connected to the space frame.

11. The three-wheeled vehicle of claim 10 further comprising a cross arm connected to the space fame frame and the rigid stem tube and the another end of each of the pair of shocks, respectively.

12. The three-wheeled vehicle of claim 8 wherein each of the right side suspension frame and left side suspension frame includes an upper A-arm and a lower A-arm.

13. The three-wheeled vehicle of claim 12 wherein each upper i\-arm and each lower A-arm includes a first end pivotably connected to a respective one of the right side wheel mount and the left side wheel mount and a second end pivotably connected to the space frame.

14. The three-wheeled vehicle of claim 13 wherein the first and second tie rods extend outward in generally opposite lateral directions between the upper A-arm and the lower A-arm of a respective one of the right side suspension frame and the left side suspension frame to a respective one of the right side wheel mount and the left side wheel mount.

15. A method of converting a motorcycle into a three-wheeled vehicle, the method comprising:
  removing a front fork and wheel assembly from engagement with a head tube of a commercially produced motorcycle;
  attaching a space frame to a forward facing portion of a frame of the commercially produced motorcycle without physically modifying the frame of the commercially produced motorcycle;
  attaching a right wheel mount and a left wheel mount to the space frame;
  attaching a tie rod to each of the right wheel mount and the left wheel mount;
  extending a rigid steer tube through the head tube of the frame of the commercially produced motorcycle and a stem tube connected to the space frame;
  connecting a handlebar to an upper end of the rigid steer tube; and
  connecting a lower end of the rigid steer tube and each respective tie rod via a yoke such that twisting of the handlebar causes rotation of the rigid steer tube relative to the head tube and the stem tube and at least partly lateral translation of the tie rods relative to the space frame to effectuate concurrent rotation of each of the right and left wheel mounts relative to the space frame.

16. The method of claim 15 further comprising attaching an original equipment manufacturer front wheel that is the same as a front wheel of the wheel assembly of the commercially produced motorcycle to each of the right wheel mount and the left wheel mount.

17. The method of claim 15 further comprising attaching the right wheel mount and the left wheel mount to the space frame with a respective left and right A-arm assembly.

18. The method of claim 17 further comprising forming each of the left and right A-arm assembly with an upper A-arm and a lower A-arm wherein each A-arm is pivotably connected to the space frame.

19. The method of claim 18 further comprising connecting a dampener between at least one of the upper and the lower A-arms of each A-arm assembly and the space frame.

20. A kit for converting a motorcycle into a three-wheeled vehicle, the kit comprising:
  a first A-arm assembly and a second A-arm assembly:
  a steering arm pivotably connected to one of the first and second A-arm assemblies, respectively;
  an axle extending in an outward lateral direction from leach steering arm, each axle constructed to rotationally support a wheel;
  a center-frame assembly having each of the first and second A-arm assemblies pivotably connected thereto such that the first and second A-arm assemblies are oriented on opposite lateral sides of the center-frame assembly;
  a first shock absorber associated with the first A-arm assembly and a second shock absorber associated with the second A-arm assembly;
  a cross bar that extends laterally across and through a cavity bounded by the center-frame assembly such that opposite ends of the cross bar engage a respective end of the first shock absorber and the second shock absorber on generally opposite lateral sides of the center-frame assembly;
  a pair of tie rods each having a first end connected to a respective steering arm and a second end that is positioned within a cavity bounded by the center-frame assembly; and
  a support tube defined by a generally elongate body having a first end secured to the cross bar that extends laterally across the center-frame assembly and a second end that is oriented to engage a neck of a motorcycle frame such that the support tube translates a load associated with the neck of the motorcycle frame to the center-frame assembly, the support tube having a passage formed therethrough that is shaped to receive a steering shaft wherein a first end of the steering shaft is pivotably connectable to each tie rod and a second end of the steering shaft is oriented to extend through the neck of the motorcycle frame when the support tube is aligned with the neck of the motorcycle frame.

* * * * *